United States Patent [19]
Gray et al.

[11] Patent Number: 6,019,939
[45] Date of Patent: *Feb. 1, 2000

[54] ALUMINIUM ALLOY BRAZING SHEET

[75] Inventors: Alan Gray; Graeme John Marshall, both of Nr. Banbury; Alan John Ernest Flemming, Banbury, all of United Kingdom

[73] Assignee: Alcan International Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/532,586

[22] PCT Filed: Apr. 5, 1994

[86] PCT No.: PCT/GB94/00724

§ 371 Date: Nov. 28, 1995

§ 102(e) Date: Nov. 28, 1995

[87] PCT Pub. No.: WO94/22633

PCT Pub. Date: Oct. 13, 1994

[30] Foreign Application Priority Data

Apr. 6, 1993 [GB] United Kingdom ................. 93302684

[51] Int. Cl.⁷ .................................................. B23K 35/28
[52] U.S. Cl. ........................... 420/528; 148/523; 148/527; 148/528; 148/535; 148/693; 148/694; 148/418; 420/535
[58] Field of Search ...................................... 148/523, 527, 148/528, 535, 693, 694, 418; 420/535, 528; 428/654; 228/262

[56] References Cited

U.S. PATENT DOCUMENTS

| 4,673,551 | 6/1987 | Sugiyama et al. | 420/535 |
| 4,906,534 | 3/1990 | Bekki et al. | 428/654 |
| 5,037,707 | 8/1991 | Fortin et al. | 428/654 |
| 5,100,048 | 3/1992 | Timsit | 228/248 |

FOREIGN PATENT DOCUMENTS

| 0327245 | 1/1989 | European Pat. Off. . |
| 8682992 | 4/1986 | Japan . |
| 2159175A | 3/1985 | United Kingdom . |

OTHER PUBLICATIONS

Patent Abstracts Of Japan; Dec. 25, 1992, vol. 6 No. 266.
Patent Abstracts of Japan; Dec. 14, 1988, vol. 12 No. 479.
Patent Abstracts of Japan; Sep. 2, 1986, vol. 10 No. 257.

*Primary Examiner*—Patrick Ryan
*Assistant Examiner*—M. Alexandra Elve

[57] ABSTRACT

Aluminum brazing alloy composition is (in wt. %): Mn 0.7–1.5, Cu 0.5–1.0, Fe not more than 0.4, Si not more than 0.15, Mg up to 0.8, V and/or Cr up to 0.3, Ti up to 0.1, others up to 0.05 each, 0.15 total, balance Al of at least commercial purity. Improved properties include: post-brazed strength and sag resistance; corrosion resistance; ability to withstand interannealing and some homogenization.

9 Claims, No Drawings

ALUMINIUM ALLOY BRAZING SHEET

BACKGROUND OF THE INVENTION

This invention relates to brazing alloy sheet of the kind comprising an aluminium-based core and on at least one side a cladding of an aluminium-based brazing alloy containing silicon as the main alloying ingredient. The brazing alloy sheet is characterised by having excellent corrosion resistance, and also improved sag resistance and post-brazed strength.

U.S. Pat. Nos. 5,037,707 and 5,041,343 (both assigned to Alcan) describe brazing alloy sheet of this kind, in which the core is typically a 3000 series alloy (from the Aluminum Association Register) containing about 0.7% to about 1.5% Mn and about 0.1% to about 0.6% Cu. The Fe concentration is no more than 0.4% and the Si concentration no more than 0.15%, and it is control of these two components that is primarily responsible for the good post-braze corrosion resistance properties. This long-life core alloy is clad on one or both sides with an Al-Si brazing alloy. The clad alloy is hot rolled, then cold rolled, preferably without any interannealing and preferably with minimum final annealing of the rolled sheet.

Both homogenisation and interannealing are detrimental to the corrosion resistance of the brazed product. The preferred copper content of the core alloy is from about 0.2% to about 0.4%.

In the resulting brazing alloy sheet, the Mn is preferably present substantially in solid solution and/or in the form of a fine precipitate of Mn-containing particles in the range of 0.03–0.1 µm. During brazing, there is formed a band, known as the brown band, of densely precipitated particles containing Al, Mn and Si. This band is typically a few tens of microns thick, at the surface of the core adjacent the cladding layer, with the silicon in the band having migrated from the cladding layer, and the band having substantially less Mn in solid solution than in the core alloy outside the band. The band is responsible for the excellent corrosion resistance of the clad side of the brazed product. Close control of the Fe and Si contents of the core alloy are required in order to obtain a satisfactory brown band.

The heat exchanger market requires aluminium brazing sheet that offers a balance of properties: corrosion resistance, brazability, strength especially post-braze strength, and formability. Often the property balance is a compromise between competing processes or microstructures. The alloys described in the aforesaid U.S. patents have excellent external corrosion resistance with adequate strength and sag resistance.

This invention is based on the discovery that alloys of this kind having higher levels of Cu, in the range of 0.5–1.0%, have surprisingly improved properties. Significant properties discussed below include strength, sag resistance, corrosion resistance and processability.

U.S. Pat. No. 4,761,267 (Sky Aluminium) describes brazing sheet comprising a core alloy consisting of 0.5–1.0% Cu, 0.6–1.0% Mn, 0.10–0.30% Ti, 0.3% or less Fe, <0.10% Si, balance Al. To one or both sides of this core alloy are applied claddings of Al—Si—Mg filler metal. A sacrificial anode metal may be applied to one side. The function of Cu is stated to shift the electrode potential of the core alloy, thereby allowing the cladding to act as a sacrificial anode; and Cu is used despite the fact that it degrades the corrosion resistance of the core material per se. Ti and Mn are both indispensable for attaining satisfactorily large cathode polarisation. Fabrication techniques are not critical: preferably a homogenising treatment at a high temperature and for a long period of time is not carried out before the hot rolling. The presence of a brown band (in the surface region of the core alloy after brazing) is not mentioned; a comparison of alloys 14 and 15 (Tables 1, 2 and 3) suggests that no brown band was present; otherwise the corrosion resistance of alloy 14 would have been 4 to 6 times better than alloy 15 (AA3003).

SAE Technical Paper 930149 teaches the importance of Ti in reducing corrosion of brazing sheet core alloy and in confining corrosion to surface layers.

Japanese Kokai 61–82992 (Furukawa Aluminium) describes aluminium alloy brazing sheet with a core containing 0.25–1.0% Cu. 0.3–1.5% Mn, <0.2% Si and <0.2% Fe. There is again no reference to any brown band being formed after brazing. The manufacturing sequence includes a step of homogenising prior to hot rolling, and the corrosion results reported are so poor as to suggest that no brown band was present in the brazed product.

Japanese Kokal 195240/1988 (Furukawa Aluminium) describes an Al brazing sheet comprising 0.3 to 0.9% Cu; 0.5 to 1.5% Mn; less than 0.2% Si; and 0.2 to 1.0% Fe; balance Al, the crystalline particle size of the material being 50 to 150 µm.

GB 2,159,175A (Sumitomo Light Metal) describes fin stock material of an alloy containing 0.6 to 1.5% Mn; 0.1 to 1.0% Cu; 0.1 to 0.75% Mg; less than 0.30% Si less than 0.8% Fe; balance Al.

SUMMARY OF THE INVENTION

This invention concerns brazing alloys of composition (in weight %):

| | |
|---|---|
| Mn | 0.7–1.5, preferably 0.8–1.2 |
| Cu | 0.5–1.0, preferably > 0.6–0.9 |
| Fe | not more than 0.4, preferably < 0.2 |
| Si | not more than 0.15, preferably < 0.12 |
| Mg | up to 0.8, preferably up to 0.5 |
| V and/or Cr | up to 0.3, preferably up to 0.2 |
| Ti | up to 0.1, preferably < 0.1 |
| Others | up to 0.05 each, 0.15 total |
| Al balance. | |

The invention is defined in the claims. In one aspect there is present a tau phase precipitate of fine AlMnCu particles which dissolve during brazing.

The invention also provides brazing alloy sheet comprising a core of the said brazing alloy, wherein there is present on at least one side of the core a cladding of an Al-based brazing alloy containing Si as the main alloying ingredient.

Although they are particularly suitable for brazing purposes, the alloys of this invention are also capable of being extruded to yield corrosion-resistant extruded sections.

In one embodiment of the invention, discussed below, the brazing alloy sheet is <0.3 mm thick.

In another aspect, the invention provides a brazed aluminium assembly produced from the brazing alloy sheet defined, wherein there is present in the Al-based core adjacent the Al-based alloy cladding, a band comprising a dense precipitate of particles containing Mn and Si, which band protects the Al-based core from corrosion.

In another aspect the invention provides a method of making the brazing alloy sheet defined, which method comprises: providing an ingot of the core alloy, cladding the ingot with the brazing alloy, hot rolling the clad ingot, cold rolling, inter-annealing and final cold rolling to a desired sheet thickness.

Although the alloys are corrosion resistant by themselves, this property may be enhanced by forming a corrosion resistant precipitate band in the alloy. Therefore, a further aspect of the invention relates to corrosion resistant articles comprising a main body of the aluminium alloy of this invention having a 20 to 50 μm thick band of Al—Mn—Si dispersoids formed in the alloy adjacent at least one surface thereof with the silicon in the band having migrated under heat treatment or brazing from a layer of silicon-containing material applied to the article, the band having less manganese in solid solution than in the alloy of the article outside the band.

These corrosion resistant articles may be formed without applying any cladding to the alloy by the process disclosed in U.S. Pat. No. 5,100,048 and WO 92/12821 or a variant thereof. Thus, the article may be produced by (i) applying as a coating to at least one surface of the alloy as defined a mixture of (a) elemental silicon and (b) a flux material capable of removing the oxide layer and which melts below 600° C., said silicon being adapted to form a brazeable eutectic with aluminium;

(ii) heating the coated alloy to a temperature above the melting point of both the flux material to remove the oxide film and the brazeable eutectic with aluminium to thereby remove oxide film on said surface and cause said silicon to dissolve into the oxide-free aluminium layer.

This process is essentially analogous to those disclosed in U.S. Pat. No. 5,100,048 and WO 92/12821 but does not involve the joining of two components, relying on the coating to form a band of Al—Mn—Si dispersolds in the alloy without requiring it to act to join alloy components. Alternatively, the corrosion resistant articles may be formed during a brazing process which joins components via the methods disclosed in these documents i.e., by heating the coated alloy with a surface of aluminium or copper (or their alloys), brass or steel, optionally coated with the mixture, in juxtaposed relation and cooling to form a solidified joint between the surfaces. In these methods, the mixture of silicon and flux material may be applied as a flux or a slurry. The slurry may include a volatile liquid carrier which may be water based or based on an organic compound such as an alcohol. The brazing flux is preferably potassium fluoroaluminate and the coating mixture preferably contains Zn. The weight ratio of silicon to flux in the coating is preferably 0.1–3:1 and the coated surfaces are generally heated to a temperature in the range of 500–600° C.

DETAILED DESCRIPTION

A representative core alloy of the kind described in U.S. Pat. Nos. 5,037,707 and 5,041,143 has the composition Mn 1.0%; Fe 0.17%; Si 0.07%; Cu 0.3%; Mg 0.3%; balance Al of commercial purity. In comparison with brazing sheet based on that core alloy, brazing sheet according to the present invention has several advantages:

Post-brazed strength improved by approximately 25%.

Post braze resistance to high temperature creep (sag resistance) increased by about 50%. This is surprising, as Cu has not been regarded as an element to improve sag resistance.

Improved corrosion resistance. This is surprising, as it was generally believed that high Cu would degrade the corrosion resistance of the core alloy per se.

Ability to withstand interannealing during cold working without loss of corrosion resistance properties. This is surprising, as it goes against the teachings of the two above U.S. patents.

Ability to withstand some homogenisation under controlled conditions, so as to increase the formability of the final sheet without sacrificing corrosion resistance.

All these properties combine to open up the possibility of rolling the brazing sheet to thinner gauges than has previously been possible. There is a commercial need for thin brazing sheet. The automotive industry is continually seeking brazing sheet which will allow down gauging by approximately 50% (from the current standard thickness of 0.4 mm down to below 0.3 mm e.g. 0.20 mm). By means of this invention, this need can be met. Indeed, cold rolling down to a thickness of 0.15 mm or even lower should be possible without catastrophic loss of strength, stiffness or corrosion resistance.

The following explanation for the surprisingly improved properties of the brazing sheet of this invention is put forward, with the caveat that it is merely an expression of belief and does not presently have experimental support. The comments relate to the possible microstructural mechanisms that could explain the benefits of adding Cu to improve corrosion resistance in sheet given an intermediate anneal and to raise the sag resistance during brazing.

The basis of these long-life core alloys, both commercial and according to the invention, is the control of Mn in the microstructure by composition and by processing.

It is important to control those elements that form coarse intermetallic particles that tie up Mn during solidification or form stable compounds during hot rolling or annealing. Fe and Si are vitally important and Cu is needed in the alloys and must also be controlled.

Cu does not form coarse constituents in these alloys but precipitates at hot rolling or annealing temperatures, 300–500° C., depending upon the concentration present. Under equilibrium conditions, Cu reduces the solid solubility of Mn by the formation of an intermetallic AlMnCu phase (τ phase) of nominal composition $Al_{20}Mn_3Cu_2$, which forms in preference to α-AlMnSi.

The presence of τ-phase has only been observed in the 0.6 wt % Cu alloy and is not present in the commercial alloy composition containing 0.3 wt % Cu. From thermodynamic calculations the phase would also be expected to be present in an alloy containing 1.0 wt % Cu. It is shown in phase calculations to exist with increasing volume fraction as Cu is increased to 1 wt %.

Its presence in the invention alloys could explain the increased tolerance to intermediate annealing which has been reported as adversely affecting corrosion in the commercial alloy. It is speculated that the formation of τ-phase "stores" a proportion of the Mn, in preference to the formation of $MnAl_6$ or α-AlMnSi, and that this phase has a lower coarsening rate at annealing temperatures than either of the aforementioned compounds. The brazed sheet corrosion resistance on the clad side is controlled by the ability of Mn particles to dissolve in the sheet core at brazing temperatures thus setting up the different corrosion potentials compared to the brown band. The starting particle size is critical as this determines the time needed for complete dissolution and which can be longer than the short brazing cycle allows.

A finer distribution of τ-phase after annealing gives the invention alloy the advantage of complete particle dissolution, this phase is not present after brazing, compared to the commercial alloy in which the Mn remains "locked up" in coarse α-AlMnSi or $MnAl_6$. Indeed even without the interanneal the invention alloy airside corrosion is slightly better than the commercial alloy.

Traditionally the sag resistance of aluminium brazing sheet alloys has been improved by either: a) a modified grain structure, elongated is better than equiaxed, or b) by adding dispersoid forming elements like Cr and Zr. It is certainly not expected that solid solution elements like Mg and Cu will affect high temperature creep.

Unexpectedly the addition of more Cu in the invention alloy produced a higher sag resistance than the commercial alloy. It can be postulated that the τ-phase is responsible by either mechanism discussed above, e.g. modifying the grain structure during processing or pinning grain boundaries in the initial stages of brazing prior to their dissolution.

The size of the τ phase particles should be controlled. If they are too large, complete dissolution will not occur during the brazing cycle impairing the post-braze strength. Particles >2 μm long are found to be too large to go into solution during normal brazing. Preferably the particles are no more than 1.5 or 1.0 μm long. Tau phase particle growth occurs during the preheating of the ingot prior to hot rolling. The preheat temperature is preferably kept below 540° C., particularly in the range 475–525° C. The hold time at elevated temperature is preferably kept below 6 hours, and may suitably be as short as conveniently possible. The higher the temperature, the shorter is the maximum permitted hold time.

With these factors in mind, the Cu content of the core alloy is set at 0.5–1.0%. Preferably the core alloy contains Cu at a concentration above 0.6%, e.g. up to 0.9%. At high copper concentration there is a risk of copper segregation and associated inhomogeneity, and although this may be avoided with care, for this reason the upper Cu limit is set at 1.0%.

The core alloy is preferably a 3000 series alloy. Manganese is a key element for providing corrosion resistance, a property in which the brown band phenomenon is implicated as noted above. At least about 0.7% Mn is required to achieve good corrosion resistance, and further improvements are not obtained above about 1.5% Mn. A preferred range is 0.8 to 1.2% particularly 0.9% to 1.1% Mn.

Fe is normally present in commercial purity alloys, but is not a desired component. Its concentration must be controlled, not more than 0.4% and preferably not more than 0.2%. Higher concentrations inhibit formation of the brown band and spoil the post-braze corrosion resistance.

Similarly, Si is a normal component of commercial purity alloys, but is not a desired ingredient in the core alloys of brazing sheet according to this invention. The Si content needs to be controlled to not more than 0.15%, preferably not more than 0.12% or 0.1% in order to permit formation of the desired brown band during brazing.

Magnesium is used in core alloys to improve strength in vacuum brazed products. For flux brazing, the Mg content of the core alloy is preferably kept at a low level. The Mg content is specified as up to 0.8%, preferably up to 0.5% e.g. 0.1 to 0.4%.

There is no evidence that additions of vanadium or chromium to the core alloy result in any improvement in post-braze corrosion resistance, which is already excellent. But chromium and vanadium additions to the core can result in improvement in sag resistance during brazing, and also in post-braze strength, particularly in conjunction with high Cu levels. When either component is used, the preferred concentration is from 0.02% up to 0.3%, since above the top end of this range there appears little added advantage.

Titanium, with or without boron, may be used in conventional concentrations as a grain refiner. Titanium is an expensive component which is not found to have any value in enhancing corrosion resistance. Too high a level of titanium may impair the ductility of the formed alloy which is necessary for the fabrication of intricate tube plates. Preferably Ti is not deliberately added. Preferably the Ti concentration in the core alloy is below 0.1%.

Zinc may be included, preferably at a concentration of 0.0 to 1.5%, so that it remains in solid solution and helps to lower the corrosion rate. Zirconium has been added to core alloys of brazing sheet, but causes casting problems and does not partition well. Due to its high melting point a high liquid metal temperature is required. Preferably Zr is not deliberately added to the core alloy.

The balance of the core alloy is aluminium, generally of commercial purity but optionally of higher purity.

The cladding is of an Al-based brazing alloy containing Si as the main alloying ingredient, whose composition is not material to the present invention. Preferred alloys are chosen from the AA 4000 series. For some applications, such as tubestock and headerstock, only one side of the core is clad with the brazing alloy. In that case, particularly if the core alloy has a high copper content, it may be useful to clad the other side with an AA1050 to 1070 or 7072 layer for the purpose of improving internal corrosion.

The core is cast by any suitable commercial casting process including belt or roller casting, with the direct chill method being preferred. A controlled and limited homogenization is possible though not preferred. The ingot is scalped and this core alloy clad with the desired brazing alloy liner plates, is preheated in the range 475–540° C. and hot rolled to bond the plates to the core and to reduce the thickness to an acceptable value for subsequent cold rolling. For the best compromise between the requirements of hot rolling and the requirements of this invention, a temperature in the range of 475–525° C. is preferred, with long soak periods at temperature being avoided. The idea is to keep the manganese in the core alloy as much as possible in solid solution or in very small precipitate particles which are small enough to be unstable when later exposed to brazing temperatures of the order of 600° C.

Hot rolling is typically effected down to a composite sheet thickness in the range 1–10 mm, and is followed by cold rolling down to a desired final sheet thickness, typically in the range of 0.15–1.5 mm for header and tube stocks and down to 0.05 mm for fin stock. An interannealing step may be necessary during cold rolling, and can surprisingly be performed without spoiling the excellent corrosion-resistance properties of the brazed sheet. In order to impart a desired amount of work to the brazing alloy sheet, the sheet thickness is preferably reduced by at least 50% during final cold rolling after interannealing.

Before brazing, the composite sheet is usually formed into the desired part. Cold rolled sheet has poor formability and it is often necessary to anneal or partially anneal to increase the formability of the material enough to enable the parts to be formed. Full annealing is typically carried out at about 350–425° C., while partial annealing is typically carried out at about 250–350° C.

During annealing, the process of silicon diffusion from the cladding into the core is initiated but the diffusion rate is very slow at temperatures of 425° C. and below. It is mostly during the brazing heat cycle, particularly in the temperature range of 550–600° C. that rapid silicon diffusion takes place and causes most of the manganese in solid solution to precipitate and form a dense band. Additional diffusion occurs on slow cooling from brazing temperature after the brazing operation.

The compositions of the core alloys used in the following experimental section are set out in Table 1. The following fabrication procedure was used. An alloy of stated composition was DC cast and scalped to give a slab 35 cm thick. This was clad on one side with a 2.5 cm thick plate of AA 4045 brazing alloy. This composition was heated to 500° C. and hot rolled down to a thickness of 3 mm (the comparative alloy) or 5 mm (the invention alloys). The resulting sheet was cold rolled down to 0.8 mm, interannealed, given a final cold rolling to 0.4 mm, and subjected to a final partial anneal. The interanneal involved a temperature ramp at 30° C. per hour followed by a 2 hour soak at temperature (Table 2). The partial final anneal involved a temperature ramp of 30° C. per hour followed by a 2 hour soak at 290° C.

The brazing alloy sheet was subjected to a simulated brazing cycle, by being heated in a furnace, held at 605–610° C. for 5 minutes, followed by air cooling. During this process, a brown band is formed in the surface of the core alloy adjacent the brazing alloy. The brown band develops fully during brazing. The brown band formed with the high Cu alloys herein described is richer and thicker than the brown band formed using the comparative 0.3% Cu alloy.

TABLE 1

| Alloy | Fe | Si | Cu | Mn | Mg | Cr | Zn | Ti | V |
|---|---|---|---|---|---|---|---|---|---|
| 1 | 0.17 | 0.05 | 0.61 | 0.98 | 0.30 | 0.001 | 0.02 | 0.06 | 0.002 |
| 2 | 0.17 | 0.05 | 0.60 | 0.97 | 0.30 | 0.14 | 0.02 | 0.06 | 0.002 |
| 3 | 0.18 | 0.05 | 0.59 | 0.98 | 0.15 | 0.15 | 0.02 | 0.06 | 0.002 |
| 4 | 0.18 | 0.05 | 0.60 | 0.98 | 0.003 | 0.14 | 0.02 | 0.06 | 0.002 |
| 5 | 0.17 | 0.07 | 0.60 | 0.98 | 0.31 | 0.002 | 0.02 | 0.07 | 0.10 |
| Comparative | 0.17 | 0.07 | 0.30 | 1.0 | 0.3 | — | — | — | — |

EXAMPLE 1

The post-braze specimens were subjected to SWAAT (ASTM G85) corrosion testing, for an exposure period of 6 weeks and were then examined to determine the number of perforations. The results are set out in Table 2.

It can be concluded from this table that the post-braze specimen based on alloy 1 had a better corrosion resistance than that based on the comparative alloy, even without interannealing. With interannealing, the difference is more marked, and interannealing temperatures in the range 250–350° C. gave better results than higher temperatures.

TABLE 2

Influence of Interannealing Temperature on Corrosion Performance (SWAAT)

| | Number of Perforations | | | | | | | |
|---|---|---|---|---|---|---|---|---|
| Inter-Annealing | Comparative Alloy | | | | Alloy 1 | | | |
| Temp. ° C. | 1 week | 2 weeks | 3 weeks | 6 weeks | 1 week | 2 weeks | 3 weeks | 6 weeks |
| 250 | 0 | 6 | 17 | 19 | 0 | 0 | 0 | 0 |
| 300 | 0 | 0 | 4 | 6 | 0 | 0 | 0 | 0 |
| 350 | 0 | 0 | 6 | 8 | 0 | 0 | 0 | 4 |
| 400 | 0 | 0 | 3 | 5 | 0 | 0 | 0 | 5 |
| 450 | 0 | 0 | 2 | 5 | 0 | 0 | 0 | 1 |
| Control No Anneal | — | — | — | 5 | — | — | — | 1 |

EXAMPLE 2

Brazed sheet samples were subjected to mechanical testing, and the results are set out in Table 3. The results obtained using the comparative core alloy and also AA 3003 are included for comparison.

TABLE 3

| Alloy | Proof Strength (MPa) | UTS (MPa) | Elongation (%) | Sag (mm) |
|---|---|---|---|---|
| 1 | 75 | 187 | 13 | 34.5 |
| 2 | 73 | 182 | 16 | 40 |
| 3 | 85 | 169 | 16 | 48 |
| 4 | 54 | 149 | 23 | 41.5 |
| 5 | 72 | 182 | 15 | 43 |
| Comparative | 55 | 150 | 15 | 70 |
| AA 3003 | 43 | 130 | 19 | 69 |

From these results that the tensile strength properties of alloys 1, 2, 3 and 5 are better than, and of alloy 4 as good as, the properties of the two comparative alloys. In the last column, a small value indicates good sag resistance, and the five invention alloys are all substantially better than the two comparative ones.

EXAMPLE 3

Two 10 tonne DC ingots not homogenised and having the compositions given in the Table 4, were scalped and clad on one side with a brazing alloy: Ingot 1 being clad with AA4343 alloy and ingot 2 with AA4045 alloy.

TABLE 4

| | Chemical Composition Wt. % | | | | | | | |
|---|---|---|---|---|---|---|---|---|
| Alloy | Si | Fe | Cu | Mn | Mg | Cr | Zn | Ti |
| Alloy 1 | 0.06 | 0.20 | 0.78 | 1.07 | 0.12 | 0.001 | 0.004 | 0.022 |
| Alloy 2 | 0.06 | 0.20 | 0.74 | 1.08 | 0.11 | 0.001 | 0.004 | 0.022 |

The clad ingots were heated to 520° C. for 8 hours and immediately hot rolled to 3.5 mm thick. The resulting sheet was cold rolled to 0.4 mm thick and then partially annealed to H24 temper by heating at 30° C./hour to 290° C. and holding for 2 hours before cooling to room temperature. Samples were then subjected to a brazing cycle by passing them through a commercial controlled atmosphere brazing furnace running the (Nocolok Trade Mark) process. The tensile properties of the samples are given in Table 5.

TABLE 5

| | Mechanical Properties | | |
|---|---|---|---|
| Alloy | PS (MPa) | UTS (MPa) | Elong. (%) |
| Alloy 1 | 69 | 166 | 18.5 |
| Alloy 2 | 70 | 160 | 14.0 |

EXAMPLE 4

Al sheet was produced from DC ingot according to this invention containing 0.6% Cu and clad with AA 4045. The assembly was preheated for 2 hours at 500° C., hot rolled to 3.5 mm, then cold rolled to 0.4mm with an intermediate anneal. The sheet had a fine tau phase i.e. the length of the particles about 0.5 microns, was found to have a post braze proof strength of greater than 70 MPa. Corresponding material having a rather higher Cu content (0.8%) was processed in the same way except that it was heated at 540° C. for 3.5 hours before hot rolling. The sheet had a coarse tau phase and was found to have a post braze proof strength of approximately 60 MPa. The difference in strength is believed to arise from the difference in size of the tau phase particles prior to brazing. The coarse particles failed to dissolve completely resulting in a loss of the solid solution strengthening effect of the copper.

The sag resistance of the material having the fine tau phase particles was found to be approximately 50% greater than that of the material having the coarse tau particles.

We claim:

1. Brazing sheet comprising a core and a cladding present on at least one side of the core, wherein the core is an alloy of composition (in wt %):

| Mn | 0.7 to about 1.5 |
|---|---|
| Cu | 0.5–1.0 |
| Fe | not more than 0.4 |
| Si | not more than 0.15 |
| Mg | up to 0.8 |
| V and/or Cr | up to 0.3 |
| Ti | up to 0.1 |
| Others | up to 0.05 each, 0.15 total |
| Al balance | | and is produced from an ingot which is preheated to a temperature below 540° C. such that there is present in the core a τ phase precipitate of fine AlMnCu particles up to 2 μm long, and wherein the cladding is an Al-based brazing alloy containing Si as the main alloying ingredient.

2. Brazing sheet according to claim 1, wherein there is present a τ phase precipitate of AlMnCu particles up to 1 μm long.

3. Brazing sheet as claimed in claim 1 which is less than 0.3 mm thick.

4. Brazed aluminium assembly produced from the brazing sheet of claim 1, wherein there is present in the Al-based core adjacent the Al-based brazing alloy cladding, a band comprising a dense precipitate of particles containing Mn and Si, said band protecting the Al-based core from corrosion.

5. Brazed aluminium assembly as claimed in claim 4, wherein the band has a thickness in the range of 20–50 μm.

6. A method of making the brazing sheet of claim 1, which method comprises; providing an ingot of the core alloy, cladding the ingot with the brazing alloy, hot rolling the clad ingot, and final cold rolling to a desired sheet thickness.

7. A method as claimed in claim 6, wherein the ingot of the core alloy is not homogenised and is preheated as aforesaid prior to hot rolling.

8. A method as claimed in claim 6, wherein she final cold rolling is performed to effect a thickness reduction of at least 50%.

9. Brazing sheet according to claim 1 wherein the core alloy has the following composition (in wt %)

| Mn | 0.8 to about 1.5 |
|---|---|
| Cu | 0.5–0.9 |
| Fe | not more than 0.2 |
| Si | not more than 0.12 |
| Mg | up to 0.5 |
| V and/or Cr | up to 0.2 |
| Ti | less than 0.1 |
| Others | up to 0.05 each, 0.15 total |
| Al | balance. |

* * * * *